Feb. 7, 1950     DE WITT H. PALMER     2,496,888
OIL RECONDITIONING OR CLARIFYING APPARATUS
Filed Jan. 22, 1947
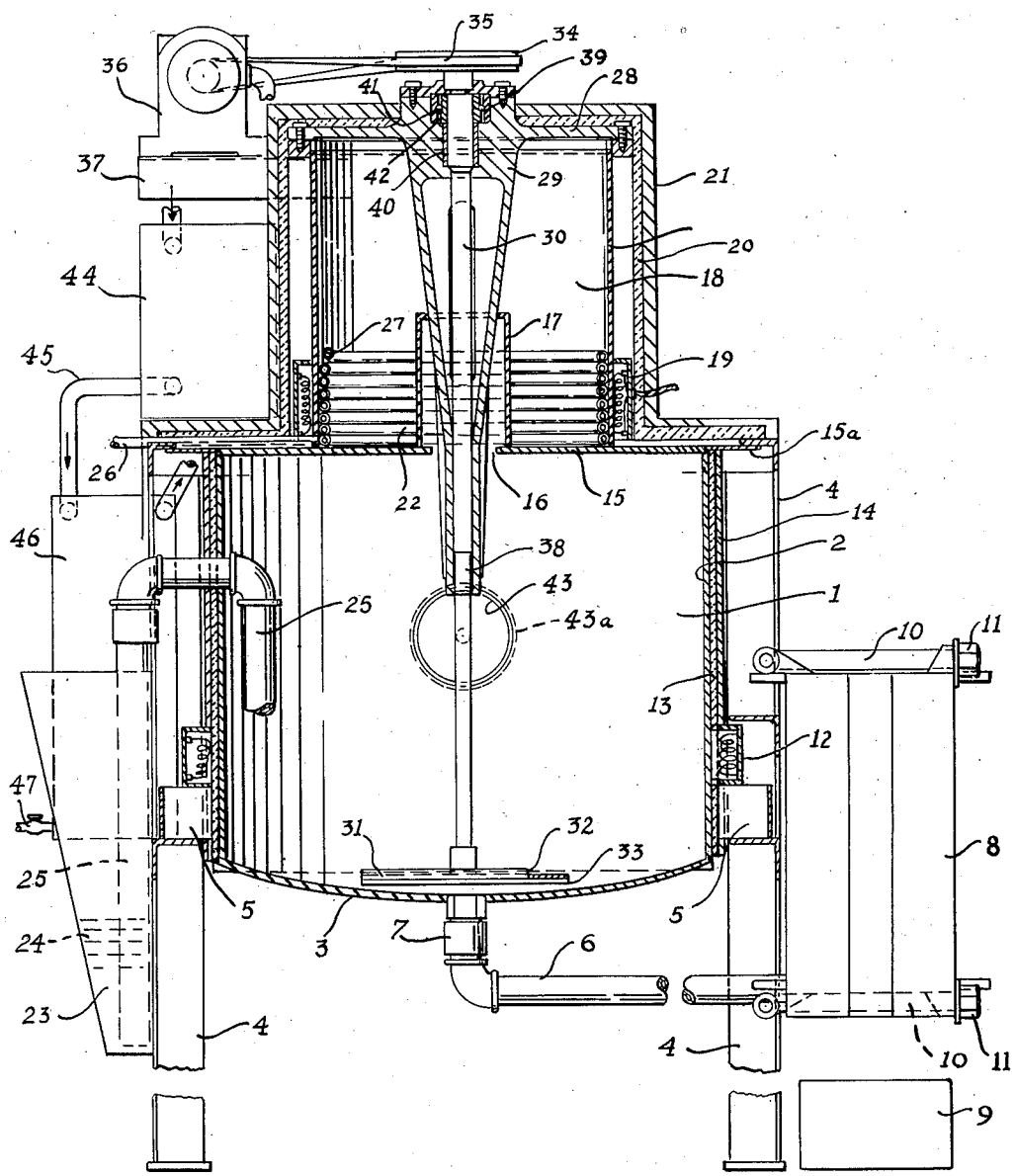
INVENTOR.
DEWITT H. PALMER
BY
Albert H. Robinson
HIS ATTORNEY Patented Feb. 7, 1950

2,496,888

UNITED STATES PATENT OFFICE 2,496,888

OIL RECONDITIONING OR CLARIFYING APPARATUS

De Witt H. Palmer, Cincinnati, Ohio

Application January 22, 1947, Serial No. 723,491

13 Claims. (Cl. 196—16)

This invention relates to an apparatus for reconditioning or clarifying oils, such as mineral oils, and more particularly pertains to an apparatus having associated with a clarifying tank, a vaporizing tank in which the oil to be reconditioned or clarified is heated and maintained at a predetermined temperature before being discharged into the clarifying tank where it is mixed with a clarifying agent. The apparatus is especially adapted for reconditioning and clarifying used mineral lubricating oils to remove and separate out the broken down constitutents of the oil and any foreign substances with which the lubricating oils are contaminated when subjected to use.

Lubricating oils are discolored and contaminated in use with dust, dirt and solid foreign particles of various kinds. Then, too, they are not only diluted with volatile motor fuels which escape into the lubricating system of gas motors, but are further diluted by being partially broken down because of the high temperatures to which they are subjected in use. Used lubricating oils when properly reconditioned and clarified are equally good in quality, and even superior to the original oil.

One aim of the present invention is to heat the oil which is to be reconditioned prior to its clarification, thereby removing most of the volatile constituents before the oil is conducted to the clarifying chamber. The improved device also is advantageous in removing with the volatile vapor fumes of the oil any moisture or water which may be contained in the clarifying material that is mixed with the oil in the clarifying chamber.

Generally described, the invention comprised a plurality of tanks, preferably, two, arranged in superposed relation with a communicating overflow passage connecting the tanks through which the oil may gravitate from one tank to another. Means is provided, preferably for both tanks, for heating the oil up to and maintaining it at a predetermined desired temperature while being clarified. Oil is conducted from a feed supply line into the superposed tank where it is heated to a sufficiently high temperature for driving off the diluent volatile components which are separated from the oil and condensed into a collecting means. The oil, separated from the volatile components, is gravitated through an overflow conduit to a bottom chamber where it is mixed with a clarifying material. Thereafter, the oil with the clarifying material mixed therewith is discharged into a filter means for separating the clarified or reconditioned oil from the clarifying material.

For a better understanding of the invention, reference is made to the accompanying drawing, in which the single figure is a cross sectional view of a machine embodying the invention.

Referring to the drawing in which like numerals are used to designate like parts, numeral 1 is a clarifying tank, preferably cylindrical, having a vertical side wall 2 and a bottom wall 3, the bottom wall being preferably concave on its inner surface. The tank is supported on any number of legs or standards 4 by means of an annular band or spaced-apart lugs 5 fastened to the outside wall of the clarifying tank.

A conduit 6, having a valve 7 therein, is connected to the bottom of the tank, at its central portion, leading to a filter, designated generally by numeral 8. The filter device is of any conventional construction, but is preferably one having a series of filter sheets or plates through which the oil is conducted to remove the clarifying material. The oil with the clarifying material mixed therein is discharged from the bottom of the tank through the conduit to the filter where the clarifying material is separated from the oil which is collected in any suitable container means 9. The filter sheets or plates are contained and held in place in a conventional filter head by bolts 10. By loosening the nuts 11 from the bolts, the filter may be readily cleaned. The filter device is of any conventional type, large or small, such as illustrated and described on pages 397 and 398 of "American Petroleum Refining" by Bell (third edition) which is incorporated by reference in connection with the disclosure of filters here. The filters may be operated by gravity or pressure feed.

Heating means 12 are arranged about the outer wall of the clarifying tank for maintaining the oil at the predetermined elevated temperature at which it is deposited therein from the superposed or vaporizing tank. The wall of the clarifying tank is advantageously insulated with any suitable insulating material 13 placed around the side wall of the tank and enclosed by a surrounding sheet metal jacket 14.

The clarifying tank is closed by a cover 15 having a central opening 16 surrounded by a tube 17 fixed to the cover which projects upward at a desired elevation into the vaporizing chamber of a superposed vaporizing tank 18. This cover serves as a bottom for the vaporizing tank, the bottom edge of the side wall of the tank being welded to the cover. A ring 15a surrounds the upper end of the clarifying tank to center and steady same. The ring is fixed to the supporting legs 4, such as by welding, with the inner edge of the ring conforming to and abutting the wall of the clarifying tank. A heating means 19, preferably electric, is arranged around the outside wall of the superposed or vaporizing tank. The wall of the superposed or vaporizing tank is also advantageously insulated with insulating material 20 surrounding same and enclosed by metal jacket 21 to prevent loss of heat from the tank. A coil 22 of copper, steel or suitable material is disposed around the tank next to the inner wall, with one end, preferably the bottom, connected to a supply or feed line, and the other end, preferably the top, opening into the vaporizing tank for discharge of the oil therein from the supply feed through the coil.

A hopper 23 is provided for holding a supply of adsorbent earthy material 24, such as fuller's earth, which is drawn into the clarifying tank by any suitable means, such as vacuum, through conduit 25. Other suitable adsorbent materials are special clays, silica gel and the like which are conventional in the art. One end of the conduit is adjacent the bottom of the hopper and the opposite end opens into the tank with an intermediate control valve in the conduit to be manipulated for opening and closing the supply line for adsorbent material.

The oil to be processed is fed into the superposed or vaporizing tank from any source of supply through conduit pipe 26 to the bottom of the coil through which it is circulated and discharged from the opposite end 27 into the vaporizing tank. The coil by being bent into coiled formation will be sufficiently resilient to re-expand to press same close to or in contact with the inner wall of the heated wall of the vaporizing tank, whereby the oil passing therethrough will be conduction heated to a predetermined temperature.

A cover 28 is placed on the top of the vaporizing tank, and this may advantageously carry a support 29 on which is mounted a vertical spindle 30. The bottom end of the spindle terminates adjacent the bottom of the clarifying tank, and has radial blades 31 mounted thereon for agitating and mixing the contents of the clarifying tank when the spindle and blades are rotated. The side edges of each of the blades may be oppositely retroverted to form small ribs 32 and 33 on opposite faces of the blades. The upper end of the spindle carries a pulley 34 fixed thereto which is driven by belt 35 from a motor vacuum pump 36. The pump is driven by any suitable prime mover, such as an electric motor (not shown), and is mounted on brackets 37. The bottom of the support 29 carries bushing sleeve 38. There is also another bearing 39, preferably anti-friction, at the upper end of the support with a packing gland 40. The bearing 39 may be a conventional ball bearing comprising balls 41 between inner and outer raceway 42.

The cover and support may advantageously be metal cast in a single unit, with the bottom end preferably terminating above a port 43 in the wall of the clarifying tank through which access is had to the tank for replacing on and removing the blade head from the bottom end of the spindle 30. The front is provided with any suitable closure 43a.

A condenser 44, connected by conduit 45 to the clarifying tank, is provided through which the diluent volatile fumes are passed from the vaporizing tank to a distillate tank 46. A discharge valve 47 is provided for drawing off the distillate from the distillate tank.

The oil which is to be reconditioned is delivered into the vaporizing tank where it is heated sufficiently high to drive off the diluent volatile constituent contained therein. The heated oil is overflowed by gravity into the clarifying tank and mixed with the clarifying agent. These are thoroughly mixed by the blades on the vertical shaft rotating within the tank. The desired amount of clarifying material is drawn by vacuum into the purifying tank from the hopper. After the oil, separated from the diluent volatile constitutents, is mixed with the clarifying agent, the mixture is discharged to the filter and filtered to remove the clarifying means.

The volatile constituents from the vaporizing tank, and the vapors from the clarifying tank, are removed by vacuum, and passed through the condenser, into the distillate tank where they are drawn off through a suitable discharge valve.

The preferred embodiment discloses the vaporizing tank superposed on the clarifying tank, thereby permitting gravity feed of the oil from the vaporizing tank to the clarifying tank. However, the tanks may be separated and arranged at the same or different elevations with the oil gravitated or pumped from one tank to the other.

While the machine embodying the invention has been described in detail, it will be understood that there may be various changes in details of construction without departing from the spirit of the invention. The invention is in the novel manner of feeding and heating the oil in the vaporizing tank, and supplementing the clarifying tank with a vaporizing tank.

I claim:

1. In an apparatus for reconditioning oil, a tank in which light fractions of the oil are vaporized, means for heating the vaporizing tank, a clarifying tank disposed at a lower elevation than the vaporizing tank, an overflow conduit connecting the vaporizing tank and the clarifying tank and disposed to maintain a predetermined oil pool level in the vaporizing tank, a condenser, a conduit means connecting the condenser and the vaporizing tank, and means for maintaining a vacuum in the vaporizing tank for removing the vapors from the vaporizing tank to the condenser.

2. In an apparatus for reconditioning oil, a tank in which the light fractions of the oils are vaporized, means for exteriorly heating the vaporizing tank, a purifying tank disposed at a lower elevation than the vaporizing tank, and an overflow conduit between the tanks whereby oil above a predetermined level may be gravitated from the vaporizing tank to the purifying tank after the oil in the vaporizing tank is heated to vaporizing temperature.

3. In an apparatus for reconditioning oil, a tank in which the light fractions of the oils are vaporized, a circulating coil disposed adjacent the inside wall of the tank through which oil may be fed into said tank from a source of supply, an overflow conduit for the tank for maintaining a pool of oil in said tank above a substantial portion of the circulating oil and a heating means disposed adjacent the outside wall of the tank.

4. In an apparatus for reconditioning oil, a tank in which the light fractions of the oils are vaporized, means for heating the tank, a conduit means from an oil supply to the tank terminating in a circulating coil within the tank adjacent the heating means, and means for feeding the oil under vacuum through said conduit means into the tank at a constant rate of flow and preheated.

5. In an apparatus for reconditioning oil, a tank in which the light fractions of the oils are vaporized, means for heating the tank, a condenser, a conduit means for an oil supply to the tank disposed adjacent to the heating means, a conduit from the tank to the condenser for removing the vapors from the vaporizing tank to said condenser, and means for maintaining a vacuum in the conduits for feeding oil to the tank and removing the vapors therefrom to the condenser.

6. A machine for reconditioning mineral oil comprising a tank in which the light fractions of the oils are vaporized, a coil disposed adjacent the inside wall of the tank through which oil is fed from a supply source to the tank, a heating means disposed adjacent the outside wall of the tank, a clarifying tank, and overflow conduit between said tanks whereby oil is gravitated to the clarifying tank from the vaporizing tank when the oil in the vaporizing tank is heated to predetermined temperature, conduit connections between the tank and a supply of oil and a supply of clarifying means, and means for vacuum feeding a supply of oil to the vaporizing tank and a supply of clarifying means to the clarifying tank.

7. A machine for reconditioning mineral oil comprising a tank in which the light fractions of the oils are vaporized, a clarifying tank beneath the vaporizing tank, an overflow conduit between said tanks whereby oil above a predetermined level is gravitated from the vaporizing to the clarifying tank after being heated to a predetermined temperature, a heating means surrounding the vaporizing tank, a coil within the heat radiating range of the heating means adjacent the inside wall of the vaporizing tank and substantially below the predetermined oil level through which oil is fed to said tank, a filter device, and a discharge conduit connecting the clarifying tank and the filter.

8. In an apparatus for reconditioning oil having a tank in which the light fractions of the oils are vaporized and a separate clarifying tank, a pipe coil in the vaporizing tank adapted to be pressed in contact with the inner side wall of said tank, heating means adjacent the outer side wall of the vaporizing tank and means for feeding the oil through the coil to be conduction heated to a predetermined temperature.

9. In an apparatus for reconditioning oil, a tank in which the oil is heated to vaporize the volatile solvents, a heating means for heating the tank wall, and an oil feed conduit coil disposed within said tank adjacent the heating means for also heating the oil while same is being conducted to the tank.

10. In an apparatus for reconditioning oil, a tank in which the oil is heated to vaporize the volatile solvents, a heating means for heating the tank wall, and an oil feed conduit coil disposed about the inside of the tank in contact with the tank wall for conduction heating the oil which is being conducted to the tank.

11. A structure as set forth in claim 10 in which the coil is resilient for being expanded in contact with the inner wall of the tank by the flow of oil through the coil to the tank.

12. In an apparatus for reconditioning oil, a tank in which the oil is heated to vaporize the volatile contents, a heating means disposed adjacent the exterior wall of said tank for heating same, an overflow conduit from said tank whereby a predetermined level of oil is maintained therein, an oil supply conduit connected to the tank with a substantial length of its discharge end disposed below the overflow to be immersed within the oil in the tank, a condenser, a conduit for removing the vapors from the tank to the condenser, and a clarifying tank into which the vapor free oil from the vaporizing tank is automatically gravitated through the overflow conduit.

13. In an apparatus as set forth in claim 12 including a filtering device into which the contents of the clarifying tank are discharged for being filtered.

DE WITT H. PALMER.

REFERENCES CITED

The following references are of record in the file of this patent:

UNITED STATES PATENTS

| Number | Name | Date |
| --- | --- | --- |
| 1,708,488 | Rosenbaum | Apr. 9, 1929 |
| 1,831,875 | Moreton | Nov. 17, 1931 |
| 1,851,432 | Ireland | Mar. 29, 1932 |
| 2,061,687 | Wilkoff | Nov. 24, 1936 |
| 2,103,635 | Palmer | Dec. 28, 1937 |
| 2,133,359 | Miller | Oct. 18, 1938 |
| 2,161,964 | Brecque | June 13, 1939 |
| 2,319,598 | Harris | May 18, 1943 |
| 2,345,595 | Gerin | Apr. 4, 1944 |
| 2,419,579 | Livingston | Apr. 29, 1947 |
| 2,451,668 | Egger et al. | Oct. 19, 1948 |

FOREIGN PATENTS

| Number | Country | Date |
| --- | --- | --- |
| 846,229 | France | June 5, 1939 |

Certificate of Correction

Patent No. 2,496,888                                    February 7, 1950

DE WITT H. PALMER

It is hereby certified that errors appear in the printed specification of the above numbered patent requiring correction as follows:

Column 3, line 71, for the word "front" read *port*; column 4, line 69, for "circulating oil" read *circulating coil*; column 5, line 9, for "for an" read *from an*;

and that the said Letters Patent should be read with these corrections therein that the same may conform to the record of the case in the Patent Office.

Signed and sealed this 23rd day of May, A. D. 1950.

[SEAL]

THOMAS F. MURPHY,
*Assistant Commissioner of Patents.*